United States Patent [19]

Morrison

[11] 4,417,757

[45] Nov. 29, 1983

[54] RECORDING DISC HANDLING DEVICE

[76] Inventor: Thomas R. Morrison, 137 Overlook St., Mount Vernon, N.Y. 10552

[21] Appl. No.: 319,475

[22] Filed: Nov. 9, 1981

[51] Int. Cl.³ .............................................. B65G 7/12
[52] U.S. Cl. ...................................... 294/26; 294/28; 294/31 R
[58] Field of Search ................... 294/26, 27 R, 25, 28, 294/31 R, 33, 99, 6, 15, 16, 17

[56] References Cited

U.S. PATENT DOCUMENTS 2,723,877 11/1955 Palmour et al. ....................... 294/28
3,282,589 11/1966 Morrison ............................... 294/28

Primary Examiner—James B. Marbert
Attorney, Agent, or Firm—Thomas R. Morrison

[57] ABSTRACT

A record handling tool employs a retractable spindle for engaging and gripping the spindle hole of a recording disc. The retractable spindle is positioned coincident with the spindle hold by contact of two spaced-apart grooves on guide arms on a record handling tool with the circular rim of the recording disc. The retractable spindle is left in its retracted position while a support arm of the tool is inserted into a dust jacket between the dust jacket and the recording disc. When contact is made between the guide arms and the edge of the recording disc, thus positioning the retractable spindle coincident with the spindle hole of the recording disc, the retractable spindle is extended from the support arm thus passing through and gripping the recording disc by its spindle hole. The recording disc remains clamped in a three point grip including two spaced-apart points of contact on the circular edge of the recording disc as well as the single point of contact at the spindle hole.

7 Claims, 11 Drawing Figures

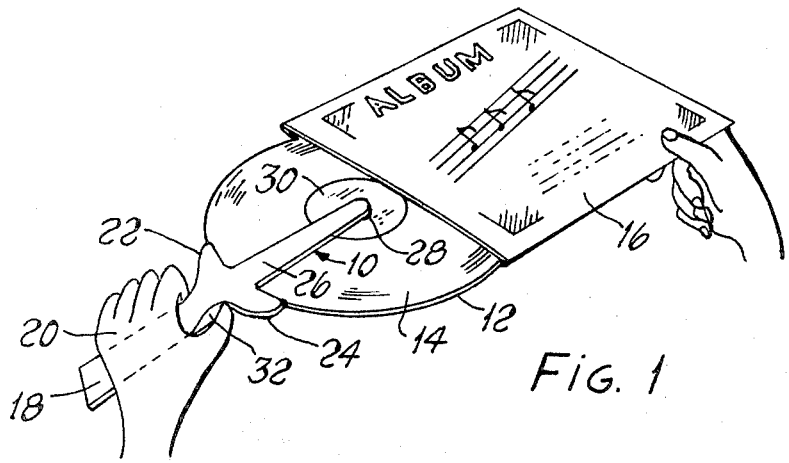
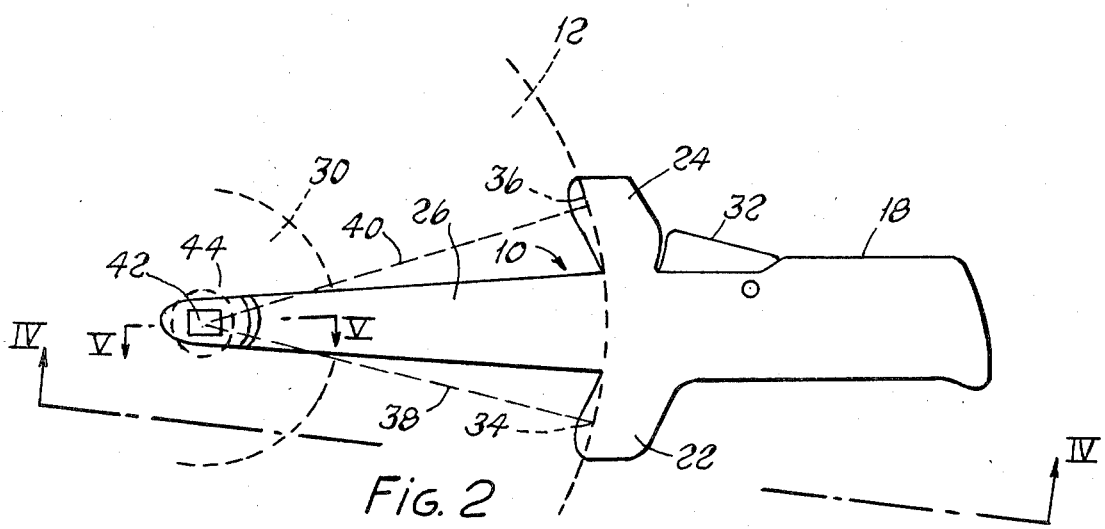
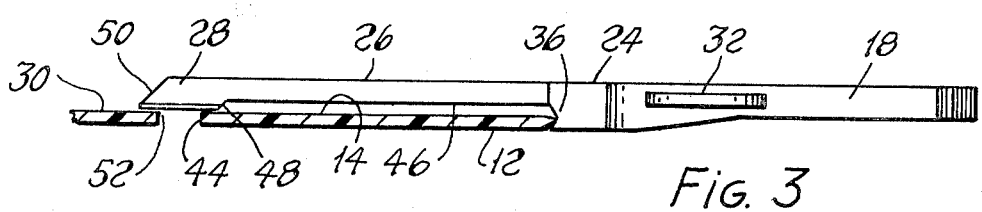
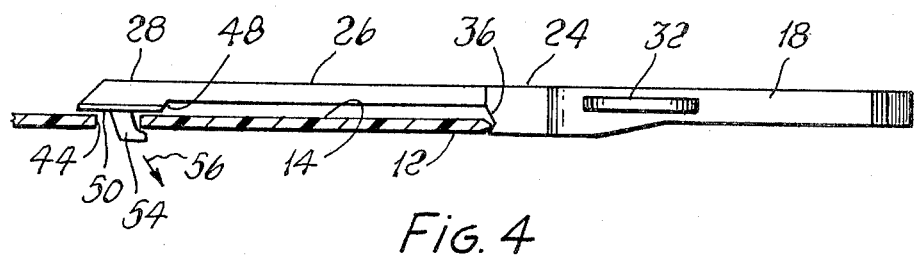

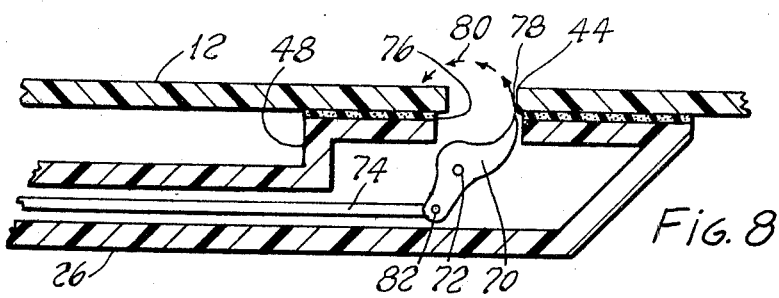
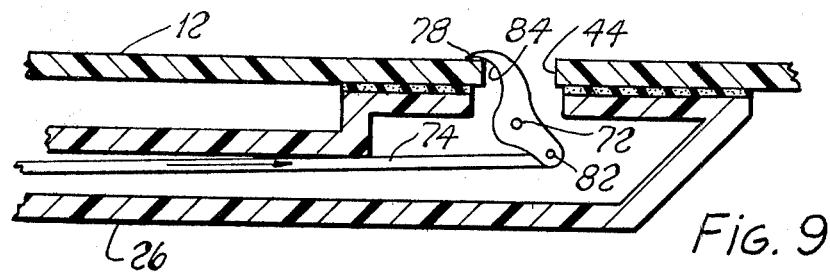
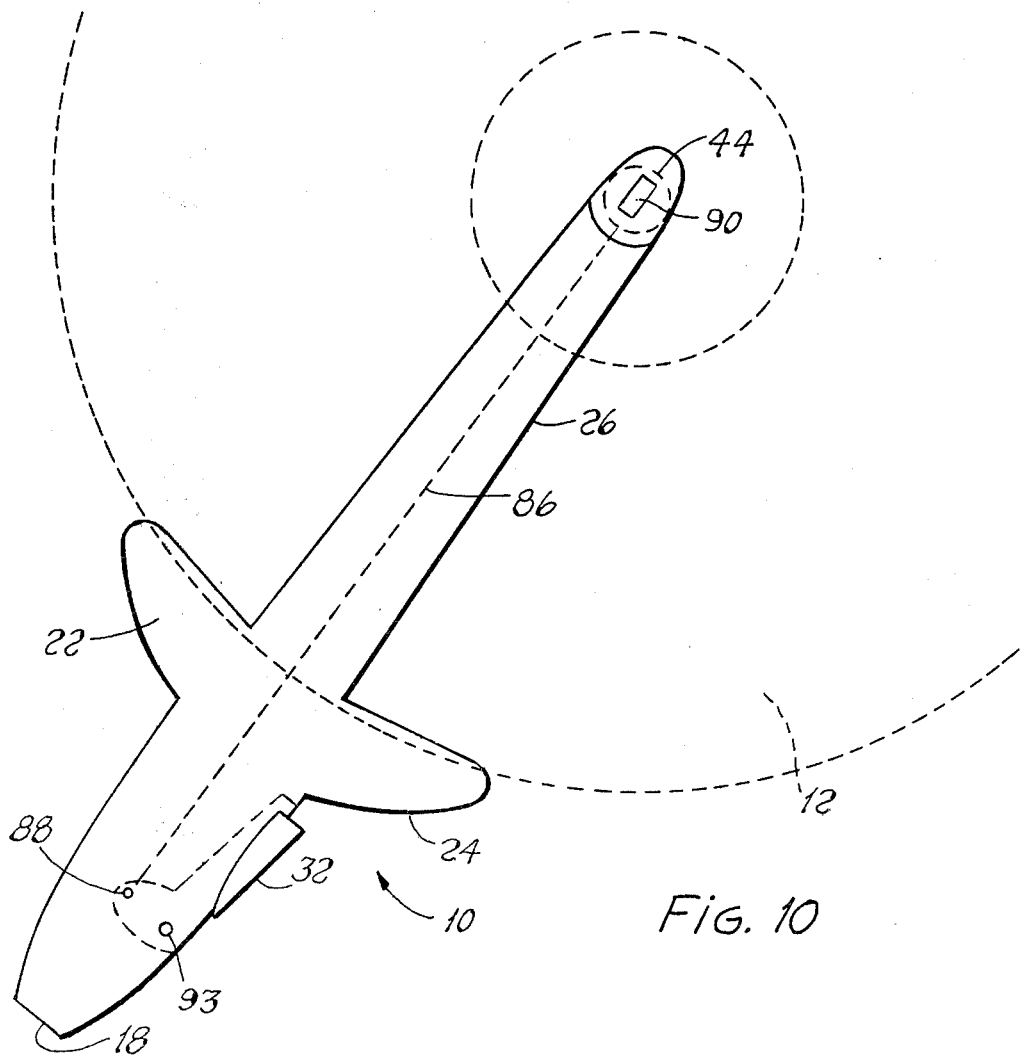

RECORDING DISC HANDLING DEVICE

BACKGROUND OF THE INVENTION

This invention relates generally to tools, and more particularly, it pertains to a device for handling record discs containing audio, data, video and the like recorded thereon without placing the fingers on the grooved area of the discs.

The prior art discloses devices which grip the edges of record discs as used in commercial mechanical audio record changers.

As background information, it is the unanimous opinion of experts in the high fidelity sound field that the grooved area of a record disc should never be touched by human hands. Such touching with hands deposits perspiration and grease upon and into the grooves. Dust and abrasive particles attach themselves firmly to the deposited grease. Grease-held materials cannot be removed from the grooves as normally occurs due to the action of the stylus and the gentle brushing of the several varieties of commercially available brushes.

Instead, these grease-held particles remain in the grooves and abrade the extremely delicate texture of the grooves which produce the sound. Consequently, when the record is repeatedly played, the quality of the sound reproduced is severely degraded, particularly with respect to high frequencies.

Additionally, the grease-held particles create immediate distortion through the generation of pops, crackles and hisses in the reproduced sound. Also, touching the recorded surface increases the incidence of surface scratches.

The prior recommended methods of handling a disc consist of placing the fingers on the label area (center of disc) and the thumb on outer edge of the disc, or, if possible handling by pressure at the outer edges only. The handling problem becomes most acute when inserting the disc in the paperboard jacket storage container or removing it therefrom.

This insertion or removal operation is probably the most awkward and uncomfortable gesture performed by a person. The removal operation consists of fanning open the jacket container with one hand, inserting the other hand into the side of the jacket to place the fingers on the label area and then withdrawing the record by friction between the fingers and the label. As the record is withdrawn, it is dangerously balanced on the fingertips and is an imminent candidate for dropping.

Substantially the same problem exists in the case of video disc recordings, particularly those in which the video and audio information are recorded by continuous grooves having appropriate modulation impressed thereon.

In my previous U.S. Pat. No. 3,282,589, I disclosed a record handling tool in which a pair of guide arms contacted the edge of a record disc which thereupon disposed a pin or spindle generally aligned with the spindle hole at the center of the record disc. A mechanical arrangement shortened the distance between the pin and the positioning arms so that the record was gripped therebetween for removal from, and insertion into, a record jacket. Although this device is successful in handling record discs without damage, some people have been concerned that the protruding pin or spindle may contact the grooved area of the record disc while inserting the holding arm between the record disc and the jacket and thereby scratch the grooved area of the disc.

OBJECTS AND SUMMARY OF THE INVENTION

It is an object of this invention, therefore, to provide a tool for gripping a record disc while it is still in its jacket and withdrawing it under firm control. Once withdrawn, the record remains under firm control in any orientation until voluntarily released. Contact between this tool and the record disc occurs only at the label area and at two points on the unrecorded outer edge.

Another object of this invention is to provide a tool for inserting a record disc into its storage jacket.

Another object of this invention is to provide a tool or device which has special utility in extracting a disc from, and inserting the disc into a paperboard jacket used for storing the disc.

It is another object of this invention to provide a tool for handling a record disc having a retractable pin or spindle for engaging the spindle hole of the record.

It is a further object of this invention to provide a tool for record handling which contains no protrusions which may injure the recorded area of a record disc.

According to an aspect of the present invention, there is provided a recording disc handling device for handling a recording disc having a circular edge and a spindle hole at a center thereof, comprising first and second spaced-apart grooved members operative to engage the circular edge of the recording disc in grooves thereof at first and second spaced-apart locations, a support arm operatively connected to the first and second grooved members, the first and second grooved members being operative, when contacting the circular edge, to position the support arm adjacent the spindle hole, a retractable spindle fully retractable in the support arm, means for extending the retractable spindle from the support arm, and the means for extending being effective to grippingly engage the retractable spindle with the spindle hole whereby the recording disc is stably gripped at three points for handling thereof.

According to a feature of the present invention, there is provided a recording disc handling device for handling a recording disc of the type having a circular edge and a spindle hole at the center thereof, comprising a handle, first and second spaced-apart guide arms on the handle, a support arm extending from the handle, a contact area on the support arm, a first groove in the first guide arm, the first groove being effective to engage the circular edge at a first point thereon, a second groove in the second guide arm, the second groove being effective to engage the circular edge at a second point thereon spaced apart from the first point, a retractable spindle in the contact area having a retracted position and an extended position the retracted position lying at an intersection of radii, the recording disc from the first and second points whereby the retractable spindle is positioned adjacent the spindle hole, means on the handle for extending the retractable spindle into gripping engagement with the spindle hole whereby the recording disc is stably gripped in the first and second grooves and at the retractable spindle.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a perspective view of an embodiment of the invention shown in the process of handling a record disc partly contained in a protective jacket.

FIG. 2 is a plan view of an embodiment of the invention.

FIG. 3 is a cross section taken along IV—IV of FIG. 2 in the non-gripping condition.

FIG. 4 is a view corresponding to FIG. 3 in the gripping condition.

FIG. 8 is a cross section similar to FIG. 5 except showing a further embodiment of the gripping mechanism in its non-gripping condition.

FIG. 9 is a cross sectional view corresponding to FIG. 8 except in the gripping position.

FIG. 10 is a top view of a record handling tool containing a further embodiment of the invention.

DETAILED DESCRIPTION OF THE PREFERRED EMBODIMENT

Figure 5:
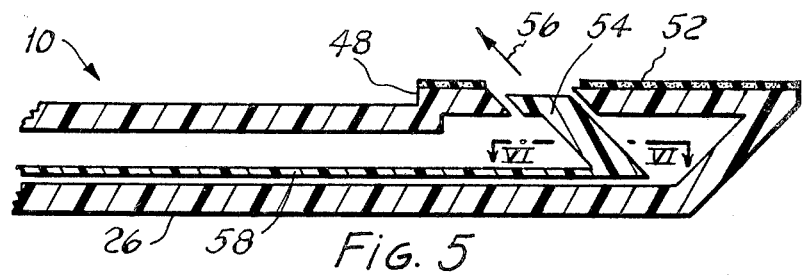
FIG. 5 is a cross section taken along V—V of FIG. 2 shown in the non-gripping condition corresponding to FIG. 3.

Referring now to FIG. 1, there is shown generally at 10, a record handling tool according to the present invention. A recording disc 12 having a grooved recorded area 14 is normally stored in an envelope-type dust jacket 16.

Record handling tool 10 includes a handle 18 enabling manipulation by a hand 20 of a user. Record handling tool 10 includes first and second guide arms 22 and 24 having grooves therein (FIGS. 2-4) operative to contact the edge of recording disc 12 at two spaced-apart locations. Contact between the edge of recording disc 12 and guide arms 22 and 24 position a support arm 26 with a contact pad 28 generally are aligned over the spindle hole of recording disc 12 in the center of the label area 30. A thumb lever 32 on handle 18 actuates a gripping mechanism to be described hereinafter which secures recording disc 12 to record handling tool 10 in order to permit safe removal and insertion of recording disc 12 in dust jacket 16 without risk of damage to grooved recorded area 14 by contact with the user's fingers, etc.

Referring now to FIG. 2, grooves 34 and 36 are disposed in the forward surfaces of guide arms 22 and 24 respectively. When the edge of a recording disc 12, shown in dashed line in FIG. 2, is positioned in grooves 34 and 36, and the radii 38 and 40, equal in length to the radius of recording disc 12 position a gripping mechanism 42 in support arm 26, to be more fully described hereinafter, coincident with a spindle hole 44 of recording disc 12.

Referring now to FIG. 3, it will be seen that groove 36 (as well as groove 34) are displaced outward from an adjacent surface 46 of support arm 26 so that, when the edge of recording disc 12 is fully seated in groove 36, recording disc 12 is supported free of contact with surface 46. Similarly, a contact pad 48 at the outer end of support arm 26 contacts label area 30 of recording disc 12 so that the entire surface 46 is supported free of grooved recorded area 14. A bevelled tip 50 is optionally provided to aid in opening dust jacket 16 for the insertion of support arm 26 therein.

A soft layer 52 of a non-abrasive, non-scratching material such as, for example, felt, foam rubber and the like is provided on the surface of contact pad 48 to prevent any chance of damaging grooved recorded area 14 during insertion of support arm 26 between dust jacket 16 and recording disc 12.

It should be noted that the surface of contact pad 48 contains no protrusions which may scratch or otherwise injure the surface of grooved recorded area 14 during the insertion of support arm 26 into the jacket. Once the condition of FIG. 3 is attained with contact pad 48 centered over spindle hole 44, thumb lever 32 may be depressed which causes a retractable spingle 54 to extend from contact pad 28 and to engage the edge of spindle hole 44 nearest handle 18. Preferably, retractable spindle 54 moves outward at an angle indicated by an arrow 56 so that recording disc 12 is firmly captured between retractable spindle 54 and grooves 34 and 36 as long as thumb lever 32 remains depressed. In the condition shown, recording disc 12 can be removed from, or inserted into dust jacket 16 under firm control without the awkwardness usually attendant upon this activity.

It has been found that, once the recording disc is free from the dust jacket, it can conveniently be handled by its edges without danger of damage to the grooved recorded area.

Figure 6:
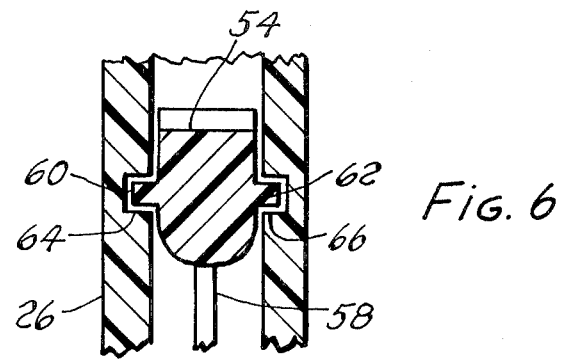
FIG. 6 is a cross section taken along VI—VI of FIG. 5.

Referring now to FIG. 5, the internal arrangement of tool 10 is shown corresponding to the external view in FIG. 3 with retractable spindle 54 fully retracted inside contact pad 48. A push-pull rod 58 actuated by thumb lever 32 is affixed to retractable spindle 54. Referring momentarily to FIG. 6, retractable spindle 54 is seen to include a pair of opposed guide lugs 60 and 62 which are guidingly engaged in guide slots 64 and 66. Guide lugs 60 and 62 as well as guide slots 64 and 66 are inclined to the vertical in the direction of diagonal arrow 56 (FIG. 5) thus to guide retractable spindle 54 in this direction when push-pull rod 58 is moved leftward in FIG. 5.

Figure 7:
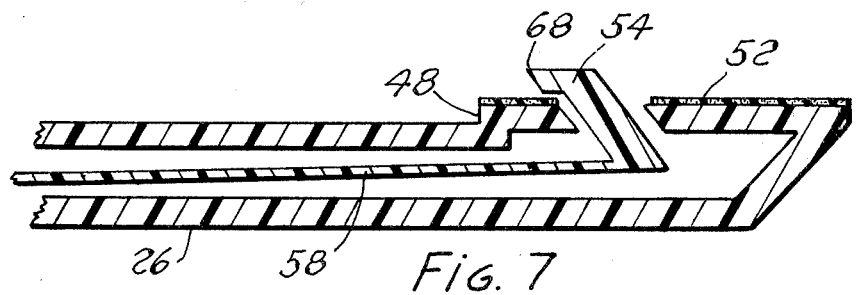
FIG. 7 is a cross section corresponding to FIG. 5 except in the gripping condition of FIG. 4.

Referring now to FIG. 7, when push-pull rod 58 is moved leftward, retractable spindle 54 is guided upward as shown to emerge beyond the upper surface of soft layer 53 thereby to engage the spindle hole 44 of a recording disc (not shown in FIG. 7). A cantilever lip 68 is optionally provided at the outer end of retractable spindle 54 to prevent recording disc 12 from disengaging retractable spindle 54 when in the condition shown in FIG. 7.

A further embodiment of the invention is shown in FIGS. 8 and 9. A rotatable finger 70 is rotatable about a pivot 72 controlled by a push rod 74 controlled by thumb lever 32 (FIG. 2). An opening 76 in contact pad 48 permits a tip 78 of rotatable finger 70 to rotate outward following a path described by curving arrow 80 when push rod 74 is moved toward the right in FIGS. 8 and 9 whereby this linear motion is coupled to rotatable finger 70 by a pivot 82. An undercut 84 on rotatable finger 70 adjacent tip 78 overlays the surface of recording disc 12 when in the extended gripping position shown in FIG. 9 whereby recording disc 12 is securely retained by rotatable finger 70 for handling recording disc 12 in and out of dust jacket 16 (FIG. 1).

Figure 11:
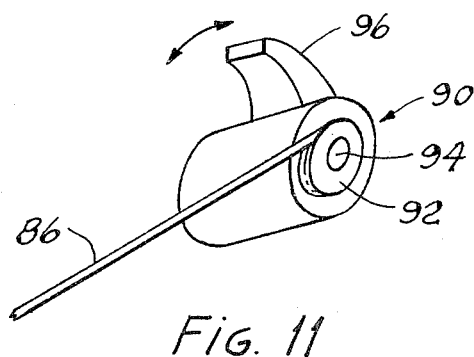
FIG. 11 is a partial close up view of a portion of the embodiment of FIG. 10 showing a rotating drum with a gripping finger attached operated by a tension member.

Referring now to FIG. 10, an embodiment of the record handling tool 10 is shown employing a tension member 86 attached at a first end to a lug 88 and at a second end around a spring loaded pulley 90. Thumb lever 32 is pivoted at its rear end at a pivot 93 whereby depressing thumb lever 32 moves lug 88 rearward and thus applies tension to tension member 86. Tension member 86 may be of any convenient material such as, for example, plastic filament such as used in fishing lines. Tension member 86 is preferably made of a material which does not stretch substantially in use. Referring now to FIG. 11, pulley 90 is shown with tension member 86 wrapped around a drum 92 at one end thereof. Pulley 90 is rotatably disposed on a pivot 94 inside support arm 26 (not shown in FIG. 11) and is spring loaded in the counterclockwise direction of FIG. 11. A finger 96 is preferably integrally formed with pulley 90 so that, when tension member 86 is pulled leftward in FIG. 11, drum 92 with pulley 90 affixed thereto is rotated in the counterclockwise direction and finger 96 emerges from contact pad 48 to engage and grip the spindle hole 44 of a record disc 12.

Having decribed specific embodiments of the invention with respect to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A recording disc handling device for handling a recording disc having a circular edge and a spindle hole at a center thereof, comprising:
   first and second spaced-apart grooved members operative to engage said circular edge of said recording disc in grooves thereof at first and second spaced-apart locations;
   a support arm operatively connected to said first and second grooved members;
   said first and second grooved members being operative, when contacting said circular edge, to position said support arm adjacent said spindle hole;
   a retractable spindle in said support arm fully retractable in said support arm;
   means for extending said retractable spindle from said support arm into said spindle hole; and
   means for grippingly engaging said retractable spindle in said spindle hole whereby said recording disc is stably gripped at three points for handling thereof.

2. A recording disc handling device according to claim 1, wherein said retractable spindle includes at least a first guide member on said spindle operative to guide said retractable spindle in a diagonal path between a retracted position and an extended position and said means for extending includes at least a second guide member on said support arm interengaging said first guide member and means for urging said retractable spindle along a path defined by said first and second guide members.

3. A recording disc handling device according to claim 1, wherein said retractable spindle includes a rotatable member in said support arm, a finger on said rotatable member, said finger being fully retractable into said support arm and extendable into gripping engagement with said spindle hole.

4. A recording disc handling device according to claim 3, wherein said means for extending includes means for rotating said rotatable member.

5. A recording disc handling device according to ckaim 4, wherein said means for rotating includes a tension member and a spring opposed to said tension member.

6. A recording disc handling device according to claim 1, wherein said support arm includes a raised contact pad surrounding said retractable spindle and a soft layer on said contact pad, said soft layer being effective to prevent contact damage to said recording disc.

7. A recording disc handling device for handling a recording disc, of the type having a circular edge and a spindle hole at the center thereof, comprising:
   a handle;
   first and second spaced-apart guide arms on said handle;
   a support arm extending from said handle;
   a contact area on said support arm;
   a first groove in said first guide arm, said first groove being effective to engage said circular edge at a first point thereon;
   a second groove in said second guide arm, said second guide arm, said second groove being effective to engage said circular edge at a second point thereon spaced apart from said first point;
   a retractable spindle in said contact area having a retracted position and an extended position;
   said retracted position lying at an intersection of radii a said recording disc from said first and second points whereby said retractable spindle is positioned adjacent said spindle hole;
   means on said handle for extending said retractable spindle into gripping engagement with said spindle hole whereby said recording disc is stably gripped in said first and second grooves and at said retractable spindle.

* * * * *